United States Patent
Phadke (10) Patent No.: US 9,559,516 B2
(45) Date of Patent: Jan. 31, 2017

(54) ARC PREVENTION IN DC POWER SYSTEMS

(71) Applicant: ASTEC INTERNATIONAL LIMITED, Kowloon (HK)

(72) Inventor: Vijay Gangadhar Phadke, Pasig (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 815 days.

(21) Appl. No.: 13/800,458

(22) Filed: Mar. 13, 2013

(65) Prior Publication Data

US 2014/0268943 A1    Sep. 18, 2014

(51) Int. Cl.
| | |
|---|---|
| *H02H 7/122* | (2006.01) |
| *H02M 1/32* | (2007.01) |
| *H02M 7/539* | (2006.01) |
| *H02M 3/156* | (2006.01) |
| *H02J 3/38* | (2006.01) |
| *H02M 1/00* | (2006.01) |

(52) U.S. Cl.
CPC ............. *H02H 7/1222* (2013.01); *H02M 1/32* (2013.01); *H02M 7/539* (2013.01); *H02J 3/383* (2013.01); *H02M 3/156* (2013.01); *H02M 2001/007* (2013.01); *Y02E 10/563* (2013.01)

(58) Field of Classification Search
CPC ......... H02J 3/383; H02J 3/385; H01H 33/596; H02M 2001/007; H02M 7/539; H02M 3/156; H02M 1/32; H02H 3/44; H02H 3/445; H02H 7/1222; H02H 1/0015; H01L 31/02021; G01R 31/1227; G01R 31/1272; G01R 31/40; G01R 31/405; Y02E 10/50; Y02E 10/56; Y02E 10/563

USPC ....... 324/536; 361/42, 43, 62; 363/50–56.02
See application file for complete search history.

(56) References Cited

U.S. PATENT DOCUMENTS

| | | |
|---|---|---|
| 5,047,724 A | 9/1991 | Boksiner et al. |
| 5,359,293 A | 10/1994 | Boksiner et al. |
| 5,539,602 A | 7/1996 | Schmitz et al. |
| 5,844,759 A | 12/1998 | Hirsh et al. |
| 5,986,860 A | 11/1999 | Scott |
| 6,292,340 B1 | 9/2001 | O'Regan et al. |
| 6,683,766 B1 | 1/2004 | Guo et al. |
| 6,833,713 B2 | 12/2004 | Schoepf et al. |
| 7,068,480 B2 | 6/2006 | Wong et al. |
| 7,876,544 B2 | 1/2011 | Kessler et al. |

(Continued)

FOREIGN PATENT DOCUMENTS

| | | | |
|---|---|---|---|
| JP | 02095130 | 4/1990 | |
| WO | WO 2013004295 A1 * | 1/2013 | ........... H02H 1/0015 |

*Primary Examiner* — Timothy J Dole
*Assistant Examiner* — Ivan Laboy Andino
(74) *Attorney, Agent, or Firm* — Harness, Dickey & Pierce, P.L.C.

(57) ABSTRACT

A power system includes a DC power source having a maximum output voltage, a DC/AC inverter having an input coupled via a connection to the DC power source and an output for supplying AC power to a load, and a control circuit for controlling the DC/AC inverter. The control circuit is configured to maintain a DC voltage at the input of the DC/AC inverter above a threshold voltage to inhibit arcing as a result of a break in the connection between the DC power source and the DC/AC inverter. The threshold voltage is substantially equal to the maximum output voltage of the DC power source less a minimum arcing voltage for the connection between the DC power source and the DC/AC inverter.

20 Claims, 5 Drawing Sheets

(56) References Cited

U.S. PATENT DOCUMENTS

| | | |
|---|---|---|
| 8,179,147 B2 | 5/2012 | Dargatz et al. |
| 8,547,669 B2 * | 10/2013 | Larson .............. H01L 31/02021 361/2 |
| 2004/0027749 A1 | 2/2004 | Zuercher et al. |
| 2012/0174961 A1 * | 7/2012 | Larson .............. H01L 31/02021 136/246 |
| 2013/0328397 A1 * | 12/2013 | Lee .......................... H02J 3/32 307/23 |
| 2014/0119072 A1 * | 5/2014 | Behrends ............. H02H 1/0015 363/55 |

* cited by examiner

ARC PREVENTION IN DC POWER SYSTEMS

FIELD

The present disclosure relates to arc prevention in DC power systems.

BACKGROUND

This section provides background information related to the present disclosure which is not necessarily prior art.

One major issue in DC power systems is the electrical arcing that can occur when a current carrying conductor breaks, e.g., due to wear and tear, aging, friction between insulated wires and sharp objects, etc. In AC power systems, arcing faults can be less severe because the arc may extinguish itself during a zero crossing of the current. However, in DC power systems, the arcing can continue indefinitely, once ignited. This can create major safety and fire hazards in applications such as electric vehicles, telecommunications central office environments, DC data centers, aircrafts, and residential photovoltaic power generation, to name a few.

To address this issue, many DC power systems are configured to detect arcing and, in response to a detected arcing condition, shut down the power source or the load.

SUMMARY

This section provides a general summary of the disclosure, and is not a comprehensive disclosure of its full scope or all of its features.

According to one aspect of the present disclosure, a power system includes a DC power source having a maximum output voltage, a DC/AC inverter having an input coupled via a connection to the DC power source and an output for supplying AC power to a load, and a control circuit for controlling the DC/AC inverter. The control circuit is configured to maintain a DC voltage at the input of the DC/AC inverter above a threshold voltage to inhibit arcing as a result of a break in the connection between the DC power source and the DC/AC inverter. The threshold voltage is substantially equal to the maximum output voltage of the DC power source less a minimum arcing voltage for the connection between the DC power source and the DC/AC inverter.

According to another aspect of the present disclosure, a DC/AC inverter includes an input for connection to a DC power source having a maximum output voltage, an output for supplying AC power to a load, and a control circuit configured to maintain a DC voltage at the input of the DC/AC inverter above a threshold voltage to inhibit arcing as a result of a break in the connection when the input of the DC/AC inverter is connected to the DC power source. The threshold voltage is substantially equal to the maximum output voltage of the DC power source less a minimum arcing voltage for the connection.

According to yet another aspect of the present disclosure, a method of operating a DC/AC inverter in a power system having a DC power source with a maximum output voltage coupled via a connection to the input of the DC/AC inverter is disclosed. The method includes maintaining a DC voltage at the input of the DC/AC inverter above a threshold voltage to inhibit arcing as a result of a break in the connection between the DC power source and the DC/AC inverter. The threshold voltage is substantially equal to the maximum output voltage of the DC power source less a minimum arcing voltage of the connection between the DC power source and the DC/AC inverter.

According to one aspect of the present disclosure, a power system includes a DC power source having an output voltage, a load coupled to the DC power source though a connection, a sensor coupled to the load for sensing a voltage at the load, and a control circuit for the DC power source. The control circuit is coupled to the sensor and configured to maintain an output voltage of the DC power source below a threshold voltage to inhibit arcing as a result of a break in the connection between the DC power source and the load. The threshold voltage is substantially equal to the sensed load voltage plus a minimum arcing voltage for the connection between the DC power source and the load.

According to another aspect of the present disclosure, a method of operating a DC power source coupled to a load via a connection is disclosed. The method includes sensing a DC voltage at the load, and maintaining an output voltage of the DC power source below a threshold voltage to inhibit arcing as a result of a break in the connection between the DC power source and the load. The threshold voltage is substantially equal to the sensed load voltage plus a minimum arcing voltage for the connection between the DC power source and the load.

According to yet another aspect of the present disclosure, a control circuit for a DC power converter is disclosed. The DC power converter is configured to provide a DC output voltage to a load when the load is coupled to the DC power converter via a connection. The control circuit includes an input for receiving a sensed load voltage. The control circuit is configured to maintain an output voltage of the DC power source below a threshold voltage to inhibit arcing as a result of a break in the connection between the DC power source and the load. The threshold voltage is substantially equal to the sensed load voltage plus a minimum arcing voltage for the connection between the DC power source and the load.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
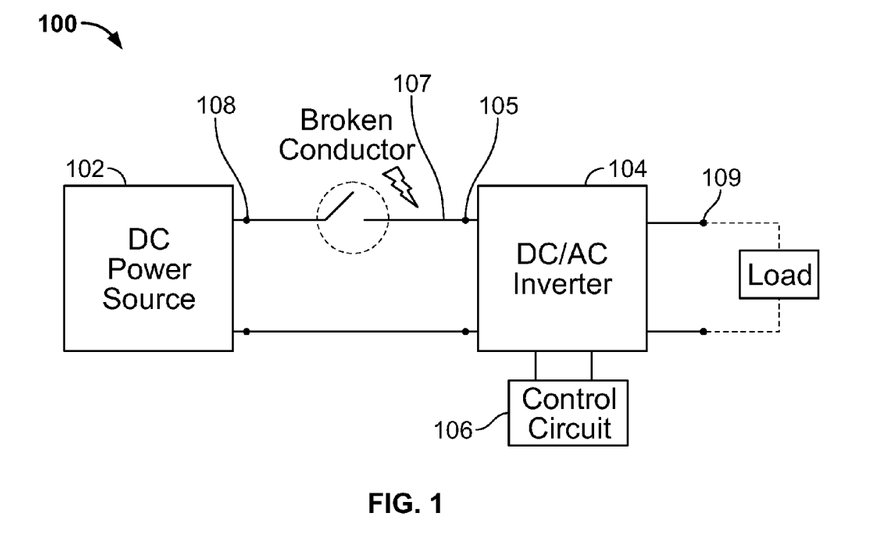
FIG. 1 is a block diagram of a system including a DC power source for supplying power to a DC/AC inverter according to one example embodiment of the present disclosure.

A power system according to one example embodiment of the present disclosure is illustrated in FIG. 1 and indicated generally by reference number 100. As shown in FIG. 1, the power system 100 includes a DC power source 102 having a maximum output voltage, and a DC/AC inverter 104 having an input 105 coupled via a connection 107 to an output 108 of the DC power source 102, and an output 109 for supplying AC power to a load. The power system 100 further includes a control circuit 106 for controlling the DC/AC inverter 104. The control circuit 106 is configured to maintain a DC voltage at the input 105 above a threshold voltage to inhibit arcing as a result of (i.e., in the event of) a break in the connection 107 between the DC power source 102 and the DC/AC inverter 104. The threshold voltage is substantially equal to the maximum output voltage of the DC power source 102 less (i.e., minus) a minimum arcing voltage for the connection 107 between the DC power source 102 and the DC/AC inverter 104.

Although the control circuit 106 is illustrated external to the DC/AC inverter 104, the control circuit 106 may reside in the DC/AC inverter 104, as apparent to those skilled in the art.

The connection 107 between the DC power source 102 and the DC/AC inverter 104 may include one or more conductors such as wires, leads, terminals, contacts, traces, etc. Thus, a break in the connection 107 may occur due to a loose wire terminal, a broken wire (illustrated in FIG. 1), or any other condition that introduces an air gap in the connection 107. If the voltage across the break exceeds the minimum arcing voltage of the connection 107, undesired electrical arcing may occur, which can cause damage such as melting of conductors, destruction of insulation, and fire.

The minimum arcing voltage may be determined by identifying the lowest minimum arcing voltage for the materials used in the connection 107. For example, materials such as copper, gold, silver, nickel, tin and iron typically have a minimum arcing voltage of 12 VDC or more. Thus, if the connection 107 includes only materials having a minimum arcing voltage of 12 VDC or more, and the voltage drop across the connection 107 is less than 12 VDC, an electrical arc will not develop when a break in the connection occurs.

As noted above, the threshold voltage is substantially equal to the maximum output voltage of the DC power source 102 less the minimum arcing voltage for the connection 107 between the DC power source and the DC/AC inverter 104. Therefore, as long as the DC voltage at the input of the DC/AC inverter 104 is maintained above the threshold voltage, the voltage drop across the connection 107 between the DC power source 102 and the DC/AC inverter 104 will always be less than the minimum arcing voltage for the connection 107. Thus, no arcing should occur in the event of a break in the connection 107.

The control circuit 106 may be configured to maintain the voltage at the input 105 of the DC/AC inverter 104 above the threshold voltage by controlling the amount of current drawn by the inverter 104 from the DC power source 102.

The control circuit 106 may be configured to maintain the input voltage of the inverter 104 at a substantially constant voltage. Alternatively, the control circuit 106 may be configured to allow the DC voltage at the input 105 of the DC/AC inverter 104 to vary within a range defined by the threshold voltage and the maximum output voltage of the DC power source 102. Alternatively, the input voltage range may have a lower boundary that is greater than the threshold voltage, and/or may have an upper boundary that is less than the maximum output voltage of the DC power source 102.

Figure 2:
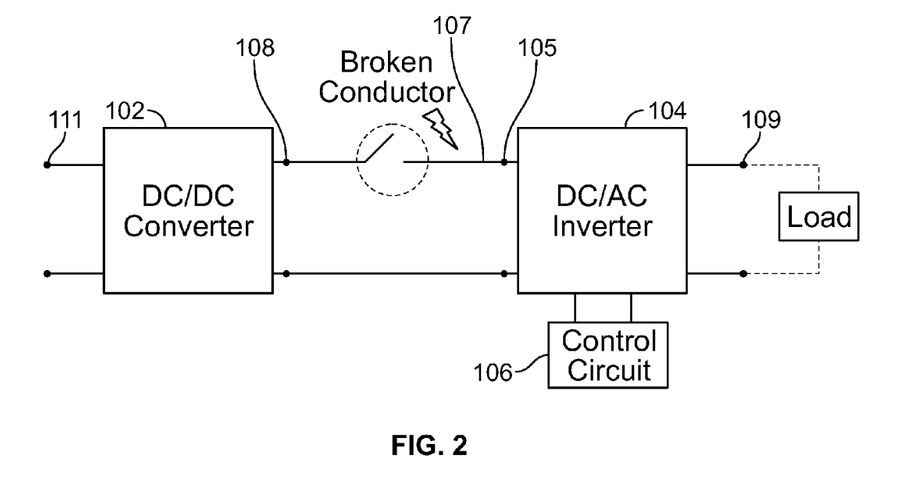
FIG. 2 is a block diagram of the system of FIG. 1 where the DC power source includes a single DC/DC converter.
Figure 3:
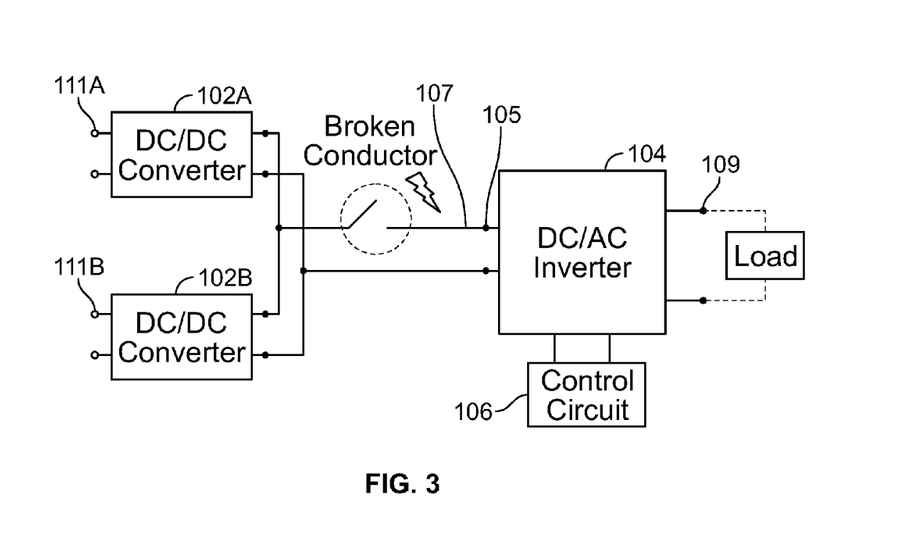
FIG. 3 is a block diagram of the system of FIG. 1 where the DC power source includes multiple DC/DC converters having outputs connected in parallel.

The DC power source 102 may include a single DC/DC converter, as shown in FIG. 2. Alternatively, the DC power source 102 may include two or more DC/DC converters 102A, 102B, as shown in FIG. 3. Further, the outputs of the DC/DC converters 102A, 102B may be electrically connected in parallel to provide a DC voltage bus to the DC/AC inverter 104. The bus voltage may be fixed or variable. Each DC/DC converter 102 may have an input 111 for connection to an input power source.

Figure 4:
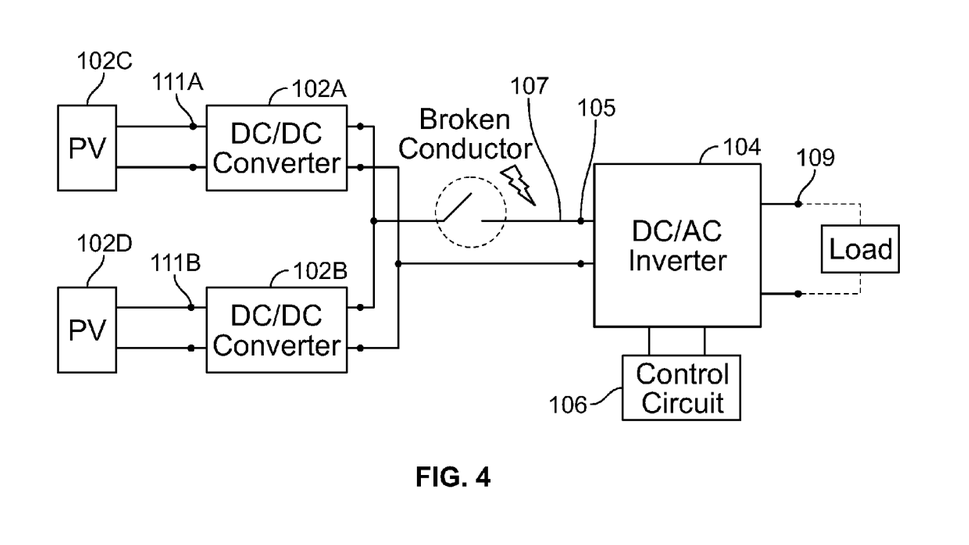
FIG. 4 is a block diagram of the system of FIG. 3 where the multiple DC/DC converters have inputs coupled to photovoltaic (PV) devices.

Additionally (or alternatively), the DC power source 102 may include one or more photovoltaic (PV) devices. For example, and as shown in FIG. 4, the DC power source 102 may include DC/DC converters 102A, 102B coupled to PV devices 102C, 102D (e.g., PV panels). The PV devices 102C, 102D may be substantially identical to one another. Alternatively, each PV device 102C, 102D may be a different type and/or size than one or more other PV devices. In that event, the type and size of the DC/DC converters 102A, 102B are preferably matched to the type and size of the PV devices 102C, 102D. The flexibility to mix-and-match converters of various types and/or power ratings allows each DC/DC converter to be optimized for its input power source. Although only two DC/DC converters 102A, 102B and two PV devices 102C, 102D are shown in FIG. 4, it should be understood that more or less DC/DC converters and PV devices can be used in other embodiments. Each PV device 102C, 102D may include one or more PV panels or cells coupled together in series and/or parallel.

Each DC/DC converter 102 may include a maximum power point tracker (MPPT) that endeavors to harvest maximum power from its input power source. Additionally, each DC/DC converter 102 may be configured to operate independently of any external control signal (e.g., from a system controller or another DC/DC converter). When multiple DC/DC converters are employed, the DC/DC converters may be substantially identical to one another. Alternatively, each DC/DC converter may be a different type and/or size than one or more other DC/DC converters. In some embodiments, each DC/DC converter is sized to match its input power source.

Further, the DC/DC converters 102A, 102B shown in FIG. 4 may be eliminated, and the PV devices 102C, 102D may be coupled directly to the DC/AC inverter 104 via the connection 107. In that event, the maximum output voltage of the DC power source may be the open circuit voltage Voc of the PV device(s).

Figure 5:
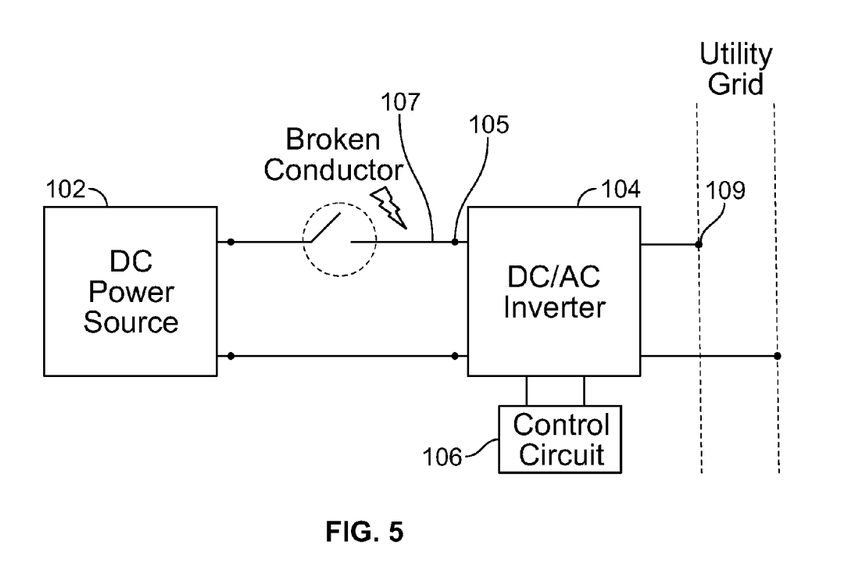
FIG. 5 is a block diagram of the system of FIG. 1 where the DC/AC inverter is coupled to a utility grid.

The DC/AC inverter 104 may be an isolated or non-isolated inverter. Further, the DC/AC inverter 104 may be a grid-tie inverter configured for connecting its output to a utility power grid (and typically having anti-islanding protection), as shown in FIG. 5. Alternatively, the DC/AC inverter 104 may be a stand-alone inverter (e.g., a residential inverter).

The control circuit 106 may include an MPPT that endeavors to harvest maximum power from the DC power source 102 (i.e., in addition to any MPPTs in the DC power source). Suitable MPPT methods include perturb-and-observe ("P & O"), constant input current regulation, constant input voltage regulation, predictive maximum power point tracking using defined characteristics of the input power source, etc.

Each DC/DC converter shown in FIGS. 2-4 may be configured (e.g., via software) to run a MPPT when its output voltage is pulled below a voltage regulation threshold level (e.g., by the DC/AC inverter 104) that is less than the maximum output voltage of the DC power source 102. For example, each DC/DC converter may initially run an output voltage regulation mode. Subsequently, when its output voltage is pulled below the voltage regulation threshold level (e.g., indicating the presence of the DC/AC inverter 104), the DC/DC converter may switch from the voltage regulation mode to an MPPT mode. Additionally, each DC/DC converter may be configured to stop running its MPPT when, e.g., its output voltage returns (i.e., rises) to the voltage regulation threshold level. In that event, each DC/DC converter may revert to the voltage regulation mode. In this manner, if the DC/AC inverter 104 stops accepting maximum power from the DC/DC converter(s), the DC/DC converter(s) may stop supplying maximum power.

Further, the control circuit 106 may be configured to maintain the DC voltage at the input of the DC/AC inverter 104 below the maximum output voltage of the DC power source 102. In particular, the control circuit 106 may be configured to maintain the DC voltage at the input of the DC/AC inverter 104 below the voltage regulation threshold level of the DC/DC converter(s), when applicable, so the DC/DC converter(s) operate in their MPPT mode. For example, suppose each DC/DC converter is configured to operate in voltage regulation mode when its output voltage is 400 VDC, and operate in MPPT mode when its output voltage is less than 400 VDC (i.e., the voltage regulation threshold level is 400 VDC). In that event, the control circuit 106 may be configured to maintain the DC voltage at the input of the DC/AC inverter 104 below 400V so the DC/DC converter(s) operate in MPPT mode and deliver maximum power to the inverter 104.

The control circuit 106 may also be configured to shut down the DC/AC inverter 104 if the control circuit cannot maintain the DC voltage at the input of the DC/AC inverter above the threshold voltage as necessary to prevent arcing in the event of break in the connection 107.

In one preferred embodiment of the present disclosure, the maximum output voltage of the DC power source 102 is about 400 VDC, and the threshold voltage is about 390 VDC. In another preferred embodiment, the maximum output voltage of the DC power source 102 is about 48 VDC and the threshold voltage is about 38 VDC.

Figure 6:
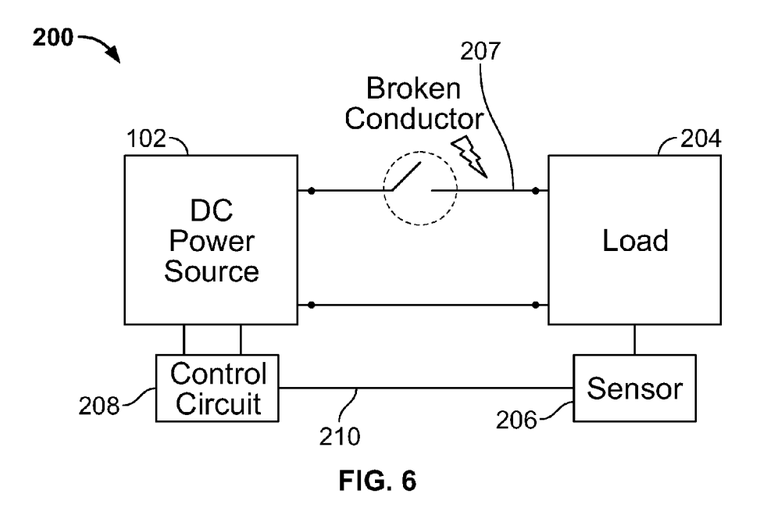
FIG. 6 is a block diagram of a system comprising a DC power source coupled to a load according to another example embodiment of the present disclosure.

FIG. 6 illustrates a DC power system 200 according to another example embodiment of the present disclosure. The system 200 includes the DC power source 102 (described above) for providing an output voltage, a load 204 coupled to the DC power source 102 through a connection 207, a sensor 206 coupled to the load 204 for sensing a voltage at the load, and a control circuit 208 for the DC power source 102. The control circuit 208 is coupled to the sensor 206 and is configured to maintain the output voltage of the DC power source 102 below a threshold voltage to inhibit arcing in the event of a break in the connection 207 between the DC power source 102 and the load 204. The threshold voltage is substantially equal to the sensed load voltage plus a minimum arcing voltage for the connection 207 between the DC power source 102 and the load 204.

Although the control circuit 208 is illustrated external to the DC power source 102, the control circuit 208 may reside in the DC power source 102, as apparent to those skilled in the art.

As shown in FIG. 6, the control circuit 208 may be coupled to the sensor 206 by a (wired or wireless) communication link 210 for monitoring the sensed load voltage.

The DC power source 102 may have an open circuit output voltage Voc that is greater than the load voltage by more than the minimum arcing voltage for the connection 207. When the DC power source 102 is coupled to the load 204, the load may reduce or "pull down" the output voltage of the DC power source 102, so the output voltage of the DC power source is substantially equal to the load voltage. However, if a break occurs in the connection 207 between the DC power source 102 and the load 204, the output voltage of the DC power source may increase to its open circuit voltage Voc and cause arcing in the connection 207. For this reason, the control circuit is configured to maintain the output voltage of the DC power source 102 below the threshold voltage, so the voltage across the connection 107 is always less than the minimum arcing voltage for the connection. In this manner, arcing in the connection 207 can be prevented, even in the event of a break in the connection 207.

Figure 7:
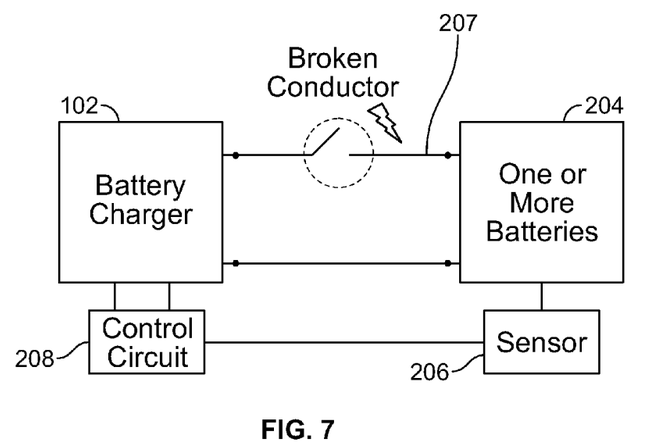
FIG. 7 is a block diagram of the system of FIG. 6 where the load includes one or more batteries and the DC power source is a battery charger.

As shown in FIG. 7, the load 204 may include one or more batteries, and the DC power source 102 may be a battery charger for charging the one or more batteries.

Figure 8:
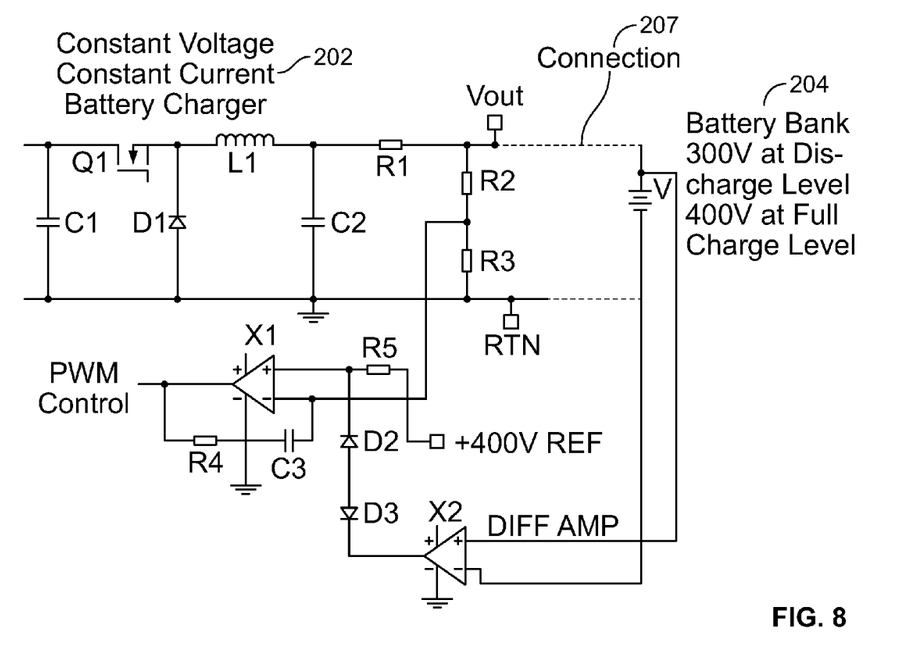
FIG. 8 is a circuit diagram of one preferred implementation of the system of FIG. 7.

FIG. 8 illustrates one preferred circuit implementation for the system of FIG. 7. As shown in FIG. 8, the one or more batteries 204 form a battery bank having a voltage that varies between a discharge voltage of 300 VDC and a charged voltage of 400 VDC. The control circuit 208 includes a 400 VDC internal reference voltage and a first differential amplifier X1 that generates a PWM control signal for a switched mode power supply (SMPS) in the battery charger 102. The sensor 206 includes a pair of sense wires coupled to a second differential amplifier X2. The positive input of the first differential amplifier X1 is coupled to the 400 VDC internal reference voltage, and is also coupled to the output of the second differential amplifier X2 through a Zener diode D2 rated at 10V. Therefore, the positive input of the first differential amplifier X1 has a maximum voltage of 400 VDC, and a minimum voltage equal to the sensed load voltage plus about 11 VDC. As a result, the output voltage of the battery charger 102 cannot exceed the load voltage by more than 11 VDC, which is less than the minimum arcing voltage of 12 VDC for the connection 207.

In one preferred embodiment, the battery charger 102 and the one or more batteries 204 form part of an uninterruptable power supply (UPS).

Figure 9:
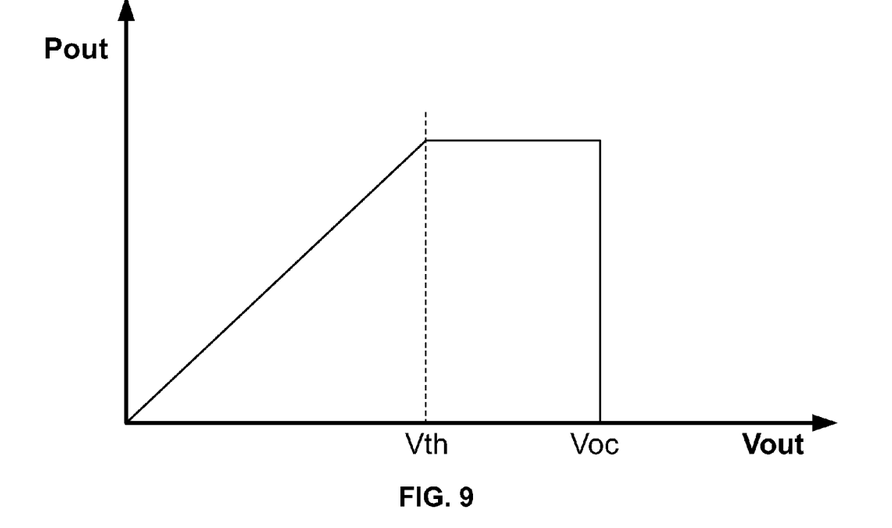
FIG. 9 illustrates an example power delivery curve for a DC power source according to some example embodiments of the present disclosure.

In some embodiments, the DC power source 102 may provide substantially constant power when its output voltage is between its open circuit voltage Voc and a lower threshold voltage Vth, as illustrated in FIG. 9. Thus, the output current will decrease as the output voltage increases, and vice versa, as shown in FIG. 10.

Figure 10:
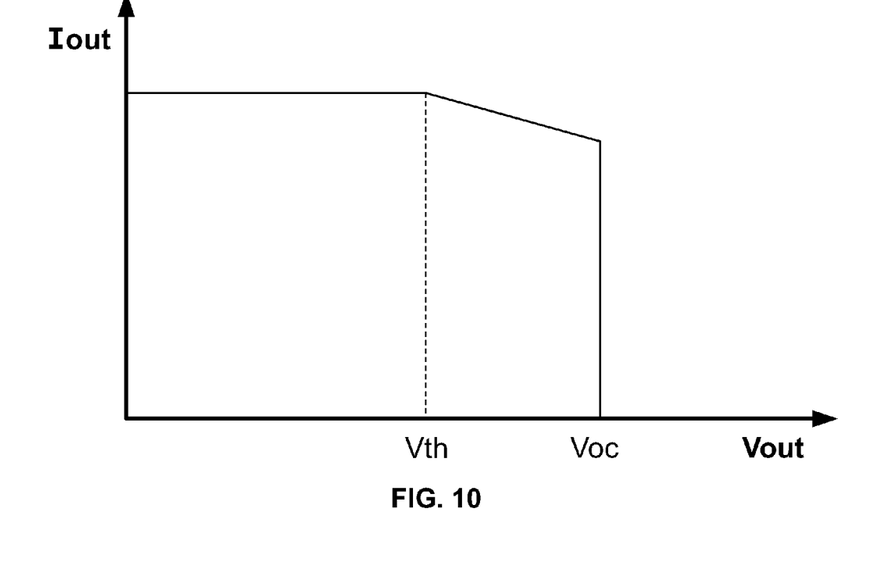
FIG. 10 illustrates an example current delivery curve for a DC power source according to some example embodiments of the present disclosure.

Additionally, the DC power source 102 may be configured to provide a substantially constant output current Iout when its output voltage Vout is below the threshold voltage Vth, as shown in FIG. 10. As a result, its output power will decrease as the output voltage Vout decreases, as shown in FIG. 9.

One example of a constant DC power source is a constant power battery charger. A charger may be designed to charge a 48V battery system and may have an open circuit voltage of 54V. The charger may deliver the same amount of power whether the battery is partially charged at 53V or deeply discharged at 44V. Lower voltage levels are compensated by increased current to keep power delivered constant. In this example system, the battery charge condition controls the output voltage of the battery charger.

Another example of a constant power DC power source is a photovoltaic power optimizer or micro converter used for solar power generation. Some technologies convert PV panel power into a constant DC power source such that it has a maximum defined voltage (Voc) and a lower defined voltage threshold (Vth) and delivers the available solar power, as controlled by an MPPT, over the voltage range from Voc to Vth.

In some embodiments, the DC power source 102 may include a switched mode power supply (SMPS). Additionally, or alternatively, the control circuit may be configured to generate a PWM control circuit for the SMPS. Further, the control circuit may include an internal reference voltage and the control circuit may be configured to generate a PWM control signal using the internal reference voltage and the sensed load voltage.

The teachings of the present disclosure may be applicable to any suitable DC power systems, including Telecom central office 48V loads, battery operated loads, 400V DC data center loads, photovoltaic systems which contain high voltage conductors, hybrid electric vehicles, aircrafts, aviation systems, etc. Example DC power sources that may be used in the systems of the present disclosure include battery banks, rectifier racks, PV panel arrays, etc. Example DC loads that may be used in the power systems of the present disclosure include inverters, DC/DC converters, computers, servers, telecommunication equipment, entertainment systems, cooling systems, fans, motor drivers, instrumentation, navigation systems, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power system comprising:
   a DC power source having a maximum output voltage;
   a DC/AC inverter having an input coupled via a connection to the DC power source and an output for supplying AC power to a load; and
   a control circuit for controlling the DC/AC inverter, the control circuit configured to maintain a DC voltage at the input of the DC/AC inverter above a threshold voltage by controlling an amount of current drawn by the DC/AC inverter from the DC power source to inhibit arcing as a result of a break in the connection between the DC power source and the DC/AC inverter;
   wherein the threshold voltage is substantially equal to the maximum output voltage of the DC power source less a minimum arcing voltage for the connection between the DC power source and the DC/AC inverter.

2. The power system of claim 1 wherein the maximum output voltage of the DC power source is about 400 VDC and the threshold voltage is about 390 VDC.

3. The power system of claim 1 wherein the maximum output voltage of the DC power source is about 48 VDC and the threshold voltage is about 38 VDC.

4. The power system of claim 1 wherein the control circuit is configured to maintain the DC voltage at the input of the DC/AC inverter at a substantially constant voltage.

5. The power system of claim 1 wherein the control circuit is configured to allow the DC voltage at the input of the DC/AC inverter to vary within a range defined by the threshold voltage and the maximum output voltage of the DC power source.

6. The power system of claim 5 wherein the control circuit includes a maximum power point tracker (MPPT).

7. The power system of claim 1 wherein the DC power source includes at least one DC/DC converter having a maximum power point tracker (MPPT), and wherein the DC/DC converter is configured to run its MPPT when its output voltage is below the maximum output voltage.

8. The power system of claim 7 wherein the control circuit is configured to maintain the DC voltage at the input of the DC/AC inverter below the maximum output voltage of the DC power source.

9. The power system of claim 8 wherein the DC/AC inverter is a grid-tie inverter.

10. The power system of claim 8 wherein the DC power source includes a photovoltaic (PV) device.

11. The power system of claim 1 wherein the control circuit is configured to shut down the DC/AC inverter if the control circuit cannot maintain the DC voltage at the input of the DC/AC inverter above the threshold voltage.

12. A DC/AC inverter comprising:
 an input for connection to a DC power source having a maximum output voltage;
 an output for supplying AC power to a load; and
 a control circuit configured to maintain a DC voltage at the input of the DC/AC inverter above a threshold voltage by controlling an amount of current drawn by the DC/AC inverter from the DC power source to inhibit arcing as a result of a break in said connection when the input of the DC/AC inverter is connected to the DC power source;
 wherein the threshold voltage is substantially equal to the maximum output voltage of the DC power source less a minimum arcing voltage for said connection.

13. The DC/AC inverter of claim 12 wherein the control circuit is configured to maintain the DC voltage at the input of the DC/AC inverter at a substantially constant voltage.

14. The DC/AC inverter of claim 12 wherein the control circuit is configured to maintain the DC voltage at the input of the DC/AC inverter below the maximum output voltage of the DC power source.

15. The DC/AC inverter of claim 12 wherein the control circuit is configured to allow the DC voltage at the input of the DC/AC inverter to vary within a range between the threshold voltage and the maximum output voltage of the DC power source.

16. The DC/AC inverter of claim 15 wherein the control circuit includes an MPPT.

17. A method of operating a DC/AC inverter in a power system having a DC power source with a maximum output voltage coupled via a connection to the input of the DC/AC inverter, the method comprising:
 controlling an amount of current drawn by the DC/AC inverter from the DC power source to maintain a DC voltage at the input of the DC/AC inverter above a threshold voltage to inhibit arcing as a result of a break in the connection between the DC power source and the DC/AC inverter;
 wherein the threshold voltage is substantially equal to the maximum output voltage of the DC power source less a minimum arcing voltage of the connection between the DC power source and the DC/AC inverter.

18. The method of claim 17 wherein controlling includes controlling the amount of current drawn by the DC/AC inverter from the DC power source to maintain the DC voltage at the input of the DC/AC inverter at a substantially constant voltage.

19. The method of claim 17 wherein controlling includes allowing the DC voltage at the input of the DC/AC inverter to vary within a range between the threshold voltage and the maximum output voltage of the DC power source.

20. The method of claim 17 wherein controlling includes controlling the amount of current drawn by the DC/AC inverter from the DC power source to maintain the DC voltage at the input of the DC/AC inverter below the maximum output voltage of the DC power source.

* * * * *